July 10, 1951 — D. W. VOORHEES — 2,560,144
BOLSTER CONSTRUCTION FOR VEHICLE UNDERCARRIAGES
Filed Feb. 3, 1948 — 3 Sheets-Sheet 1

INVENTOR
Daniel W. Voorhees
By Carlson, Pitzner, Hubbard & Wolfe
ATTORNEYS

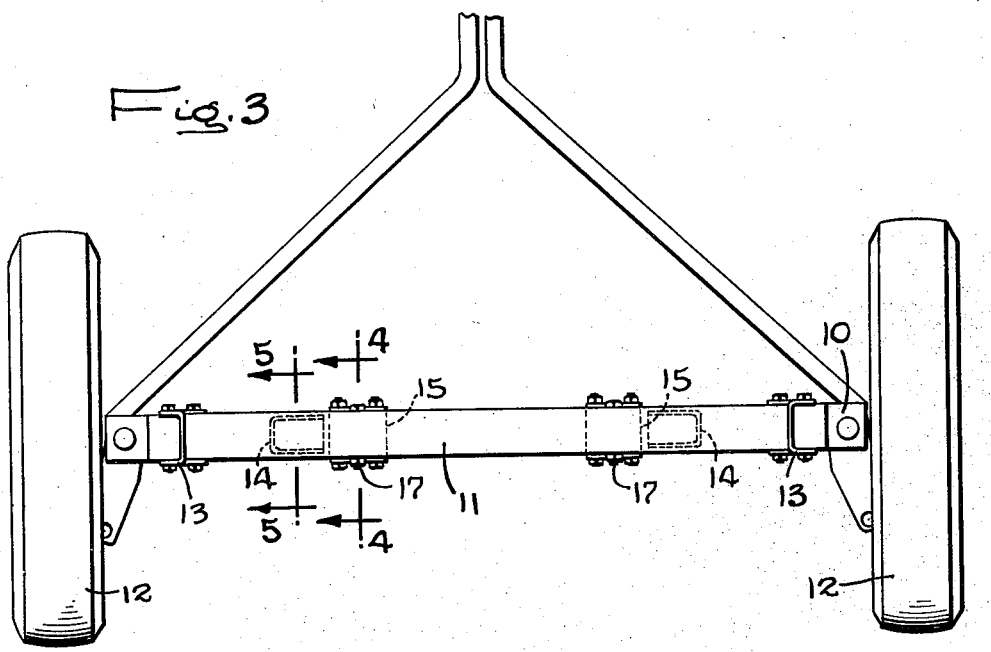
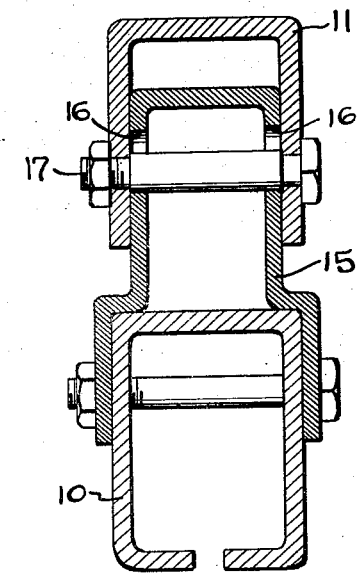
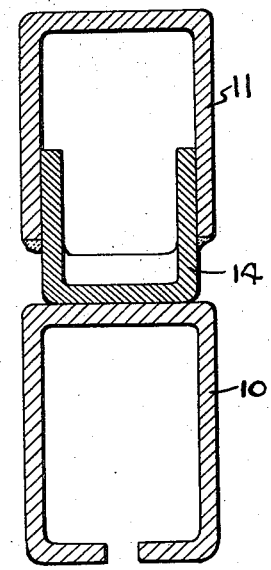

July 10, 1951 D. W. VOORHEES 2,560,144
BOLSTER CONSTRUCTION FOR VEHICLE UNDERCARRIAGES
Filed Feb. 3, 1948 3 Sheets-Sheet 3
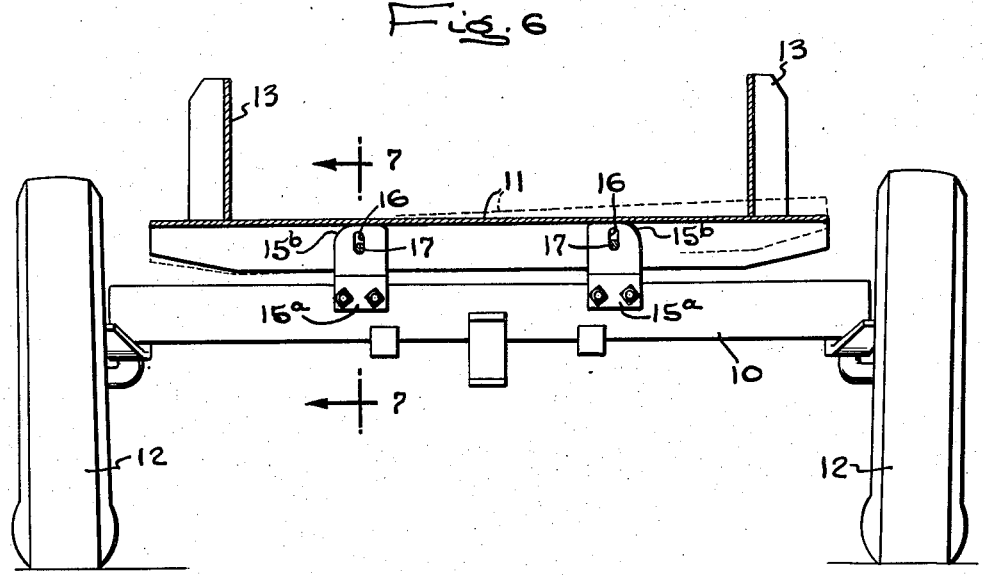
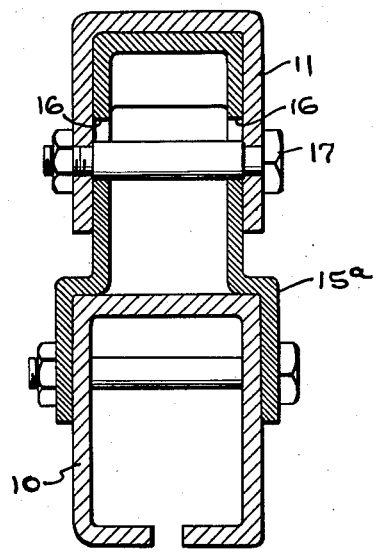
INVENTOR
Daniel W. Voorhees
By Carlson, Pitzner, Hubbard & Wolfe
ATTORNEYS Patented July 10, 1951

2,560,144

UNITED STATES PATENT OFFICE 2,560,144

BOLSTER CONSTRUCTION FOR VEHICLE UNDERCARRIAGES

Daniel W. Voorhees, Quincy, Ill.

Application February 3, 1948, Serial No. 5,930

6 Claims. (Cl. 280—111)

The present invention pertains to vehicle undercarriages and more particularly to bolster and axle assemblies for use in wagons and the like.

The general object of the invention is to provide a novel mechanism of the type indicated which will minimize the wracking to which a vehicle body carried on the bolster is subjected during use, particularly in passing over rough and uneven ground.

More particularly, it is an object to afford an assembly having the operating attributes noted above and which is well suited to low cost manufacture in quantity production but which will nevertheless be rugged and serviceable.

Further objects and advantages of the invention will become apparent as the following description proceeds, taken in connection with the accompanying drawings, in which:

Fig. 3 is a plan view of the front axle and bolster assembly of Fig. 2.

Figs. 4 and 5 are enlarged transverse sectional views taken substantially along the lines 4—4 and 5—5, respectively, in Fig. 3.

Figure 2:
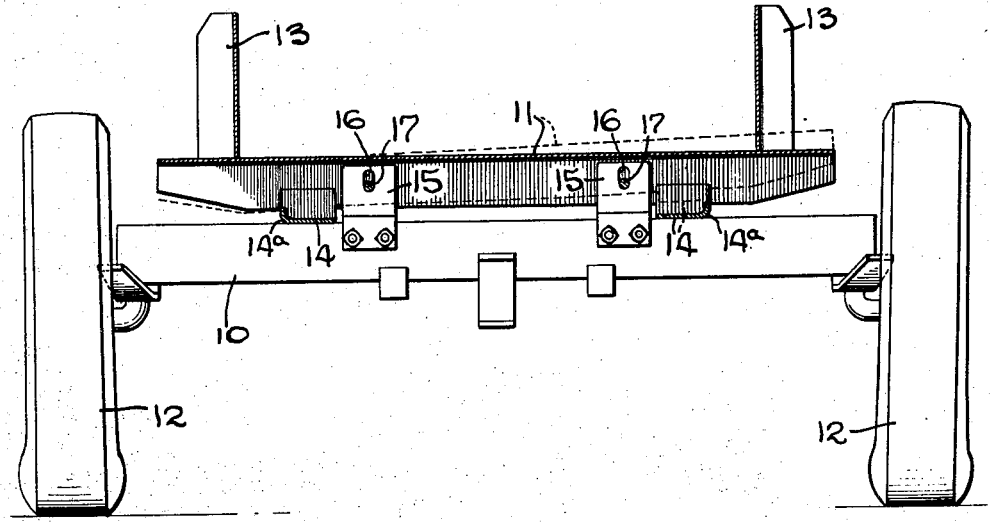
Fig. 2 is a front elevation, on somewhat enlarged scale, of the front axle and bolster of the undercarriage shown in Fig. 1 and with the bolster shown in longitudinal section, a moved position for the same being indicated in broken lines.

Fig. 6 is a view similar to Fig. 2 but illustrating a modified form of construction embodying the invention.

Fig. 7 is an enlarged sectional view taken substantially along the line 7—7 in Fig. 6.

Although particular embodiments of the invention have been shown and described in some detail, there is no intention to thereby limit the invention to such details. On the contrary, the intention is to cover all modifications and alternative constructions falling within the spirit and scope of the invention as expressed in the appended claims.

Figure 1:
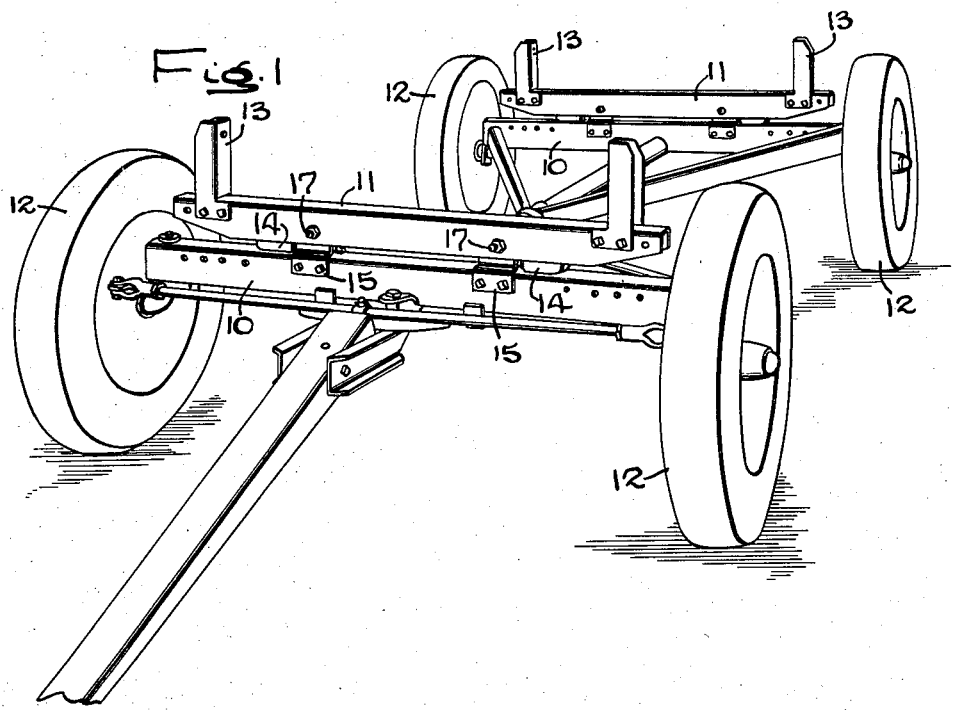
Figure 1 is a perspective view of a wagon undercarriage embodying the present invention.

Referring more particularly to the first illustrative embodiment of the invention here shown, the invention has been exemplified as embodied in an undercarriage for a farm wagon (see Fig. 1). Such undercarriage includes front and rear axles 10 adapted to receive pairs of pneumatic tired road wheels 12 at their outer ends. On each axle 10 is rockably mounted a corresponding bolster 11 having a pair of uprights 13 thereon for reception of a wagon box or other vehicle body (not shown). The front and rear axles are joined by some suitable arrangement of center pole and hounds but which need not be detailed here since they constitute no part of the present invention.

Since the front and rear axle and bolster assemblies are substantially identical, a description of one will suffice for both. In the front assembly illustrated, the axle 10 is fashioned of pressed steel, being of box form, as best shown in Figs. 4 and 5. The bolster 11 is also fashioned of pressed steel and is of an inverted channel shape. The bolster overlies the axle, extending endwise of the same throughout a major portion of the axle's length. The lower sides of the bolster are cut away or relieved, adjacent the ends, as illustrated, so that they will not strike the axle upon relative endwise rocking or tilting of the bolster and axle.

A pair of laterally spaced bearing points for the bolster 11 on the axle 10 are afforded, the same being located at points spaced equidistantly on opposite sides of the axle's center and toward the respective road wheels at the axle's ends. By thus making provision for rocking of the bolster about alternate spaced bearing points so located, twisting or wracking of the vehicle body is minimized. Such result ensues since the moment arm of the twisting forces which are applied to the vehicle body are substantially reduced as compared to the length of such moment arms when a central bearing point for the bolster is provided.

In the present instance the spaced bearing points referred to above are provided by a pair of bearing pads 14 welded or otherwise rigidly fixed to the underside of the bolster 11. These pads may also be fashioned of pressed steel, being of U shape and protruding down beneath the bolster. The pads 14 present flat bottom faces resting freely on the flat top face of the axle 10. The outer ends or noses 14a of the bearing pads are rounded as shown in Fig. 2 so that they will not dig into the axle when the bolster rocks on the same.

Restraint or limit on the amount of rocking of the bolster 11 relative to the axle 10 is accomplished by suitable lost motion connections between the bolster and axle and which also serve to restrain the bolster against endwise displacement relative to the axle. Such connections are illustrated herein as comprising a pair of upstanding brackets 15 of inverted U shape (see Figs. 2 and 4) bolted to the axle 10. The upper portions of these brackets are of reduced width so that they fit freely within the bolster, the latter being telescoped down over them. Vertical slots 16 in the brackets 15 receive transverse bolts or pins 17 passing between and fixed to opposite side walls of the bolster 11.

With the axle and bolster assemblies arranged as described above, the pads 14 rest solidly on the underlying axle when the wagon is on level ground with a uniform loading. When required, as for example in passing over uneven ground, however, pitching or tilting of the bolster and axle can take place. The bolster 11 may, for example, rock from the full-line position of Fig. 2 to the dotted-line position, rocking about the left hand one of the bearing pads 14. With equal facility the bolster may rock in the opposite direction about the nose of the right hand bearing pad 14. In either case the extent of such rocking motion is limited by the pin 17 at the rising end abutting against the upper ends of its corresponding pair of slots 16, and under all conditions the confinement of the pins 17 in the slots 16 prevents more than a very limited endwise displacement of the bolster relative to the axle.

From the foregoing it will be perceived that a simple and inexpensive undercarriage has been provided which is nevertheless comprised of strong and serviceable structural members. Moreover, it is of such character as to protect the vehicle body against undue wracking or twisting.

In Figs. 6 and 7 is shown a modified construction which also embodies the invention. A number of the parts are duplicates of those shown and described in connection with the first embodiment and consequently the same reference numerals have been used to identify the same. Thus, in Fig. 6 the construction includes, as before, an axle 10 of box form and a bolster 11 of inverted channel form. Journaled on opposite ends of the axle are ground wheels 12 and projecting upwardly from the bolster 11 are wagon-box receiving brackets 13.

The bolster 11 of Figs. 6 and 7 slidably receives a pair of upstanding brackets 15ᵃ fixed to the axle 10 at points spaced equidistantly on opposite sides from the center of the axle. The brackets 15ᵃ are of inverted U shape, being substantially like the brackets 15 previously described in connection with Figs. 1 to 5 except in this instance the brackets 15ᵃ are somewhat higher so that the bolster 11 rests directly on their tops.

The same form of pin and slot connections is provided between the bolster and brackets, constituted in this instance by vertically elongated slots 16 in the brackets 15ᵃ for receiving transverse pins 17 extending between opposite side walls of the bolster.

In the case of the brackets 15ᵃ, just as in the case of the brackets 15 previously described, the brackets are snugly although slidably received within the inverted channel of the bolster so that the bolster is restrained against fore and aft movement by its contact with the brackets. The pin and slot connections 16, 17 serve in each instance to restrain the bolster against endwise movement while at the same time permitting limited vertical or tilting movement. It will be evident, of course, that the bearing pads 14 of Figs. 1 to 5 are omitted in the modified arrangement of Figs. 6 and 7 so that the construction is somewhat simpler and of lower cost. In the arrangement of Figs. 6 and 7, the rocking of the bolster 11 takes place about the upper ends of alternate ones of the brackets 15ᵃ rather than about separate bearing pads. The outer noses of the brackets 15ᵃ are for that reason rounded as indicated at 15ᵇ so that the edges of the brackets will not dig into the bolster during the rocking movement.

I claim as my invention:

1. In an undercarriage for a vehicle, the combination of a transverse axle adapted to have road wheels journaled at its opposite ends, a bolster extending lengthwise of said axle and overlying the latter throughout a major portion of the axle's length, said bolster being of inverted channel form, a pair of upstanding brackets fixed to said axle at points spaced on opposite sides of the axle's center and slidably received within said inverted channel bolster, said bolster being slidable vertically on said brackets but restrained against fore or aft movement by engagement with the same, and pin and slot connections between said brackets and bolster restraining the latter against endwise displacement and limiting upward tilting movement of said bolster with reference to said axle.

2. In an undercarriage for a vehicle, the combination of a transverse axle adapted to have road wheels journaled at its opposite ends, a bolster extending lengthwise of said axle and overlying the latter throughout a major portion of the axle's length, said bolster being of inverted channel form, a pair of upstanding brackets of inverted U shape fixed to said axle at points spaced equidistantly on opposite sides of the center of the axle and snugly received within said bolster, each of said brackets having a vertically elongated slot therein, and transverse pins in said bolster extending through said slots.

3. In an undercarriage for a vehicle, the combination of a sheet metal axle of box form adapted to receive road wheels at its opposite ends, a sheet metal bolster of inverted channel form extending lengthwise of said axle along its upper side for a major portion of such axle's length, a pair of U-shaped sheet metal bearing pads having upwardly curved outer noses, said pads being fixed to the underside of said bolster and protruding downward to rest on said axle at points spaced equidistantly on opposite sides of the latter's center, a pair of upstanding brackets fixed to said axle and located adjacent respective ones of said pads but inboard of the same, and pin and slot connections between respective ones of said brackets and said bolster restraining the latter for limited upward and lateral tilting movement about the noses of alternate ones of said pads.

4. In an undercarriage for a vehicle, the combination of a transverse axle adapted to have road wheels journaled at opposite ends, a bolster extending lengthwise of said axle throughout a major portion of such axle's length, a pair of upstanding brackets rigid with said axle at points spaced on respective opposite sides from the center of said axle and toward said wheels and normally supporting said bolster on the upper ends thereof, and connecting means between said axle and bolster restraining the latter for limited tilting movement about alternate ones of said brackets.

5. In an undercarriage for a vehicle, the combination of an axle adapted to receive road wheels at its opposite ends, a bolster of inverted channel form extending lengthwise of said axle along its upper side and throughout a major portion of such axle's length, a pair of inverted U-shaped bearing brackets rigid with said axle at points spaced equidistantly on opposite sides of the center of the axle with the bight portions of said brackets engaging the underside of the web portion of said bolster, and pin and slot connections between respective ones of said brackets and said bolster restraining the latter for limited upward and lateral tilting movement about the outer upper edges of alternate ones of said brackets.

6. In an undercarriage for a vehicle the combination of a transverse axle adapted to have road wheels journalled at its opposite ends, a bolster extending lengthwise of said axle and overlying the latter throughout a major portion of the axle's length, said bolster being of inverted channel form, a pair of upstanding brackets fixed to said axle at points spaced on opposite sides of the axle's center and slidably received within said inverted channel bolster, said bolster being slidable vertically on said brackets but restrained against fore-and-aft movement by engagement with the same, pin and slot connections between said brackets and bolster restraining the latter against endwise displacement and limiting upward tilting movement of said bolster with reference to said axle, and a pair of bearing pads interposed between the bolster and the axle and alternately supporting the bolster upon tilting movement thereof.

DANIEL W. VOORHEES.

REFERENCES CITED

The following references are of record in the file of this patent:

UNITED STATES PATENTS

| Number | Name | Date |
| --- | --- | --- |
| 1,383,203 | Hartsock | June 28, 1921 |
| 1,402,625 | Laughlin | Jan. 3, 1922 |